United States Patent [19]

Ueda et al.

[11] 4,021,778

[45] May 3, 1977

[54] PATTERN RECOGNITION SYSTEM

[75] Inventors: Hirotada Ueda; Takeshi Uno, both of Sayama; Sadahiro Ikeda, Tokyo, all of Japan

[73] Assignee: Hitachi, Ltd., Japan

[22] Filed: Aug. 2, 1976

[21] Appl. No.: 710,417

[30] Foreign Application Priority Data

Aug. 1, 1975 Japan .............................. 50-93096

[52] U.S. Cl. .............. 340/146.3 AC; 340/146.1 R; 340/146.3 MA

[51] Int. Cl.$^2$ ......................................... G06K 9/12

[58] Field of Search ......... 340/146.3 M, 146.3 MA, 340/146.3 AC, 146.3 Q, 146.1 AB, 146.1 AL, 146.1 AQ, 146.1 AV, 146.1 BA; 235/177, 182, 186, 189; 307/216

[56] References Cited

UNITED STATES PATENTS

| | | | |
|---|---|---|---|
| 3,718,905 | 2/1973 | Tong | 340/146.1 AQ |
| 3,891,969 | 6/1975 | Christensen | 340/146.1 AL |
| 3,973,242 | 8/1976 | Fields et al. | 340/146.1 BA |

*Primary Examiner*—Leo H. Boudreau
*Attorney, Agent, or Firm*—Craig & Antonelli

[57] ABSTRACT

A pattern recognition system comprises a partial pattern cutting out system which has a plurality of cutting out windows previously provided in correspondence with a plurality of regions in a specific pattern which respectively correspond to a characteristic part of the specific pattern to be recognized and which constitute patterns symmetric to each other. A binary input signal is cut out by the use of the partial pattern cutting out apparatus. The EXCLUSIVE OR function between the corresponding bits of the partial patterns obtained from the plurality of cutting out windows are evaluated by EXCLUSIVE OR circuits. The number of outputs of predetermined logic level among the outputs of the EXCLUSIVE OR circuits and a preset number are compared, and the coincidence between both the numbers is sought. When both numbers coincide, the inputted signal is recognized as being the specific pattern.

11 Claims, 24 Drawing Figures

FIG. 1a
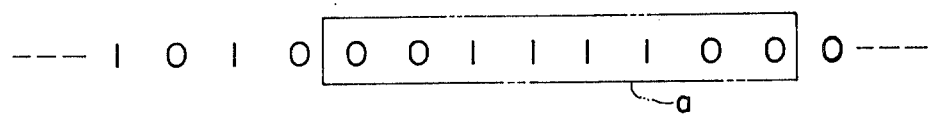
FIG. 1b
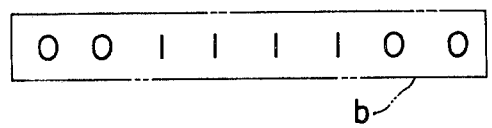
FIG. 2a
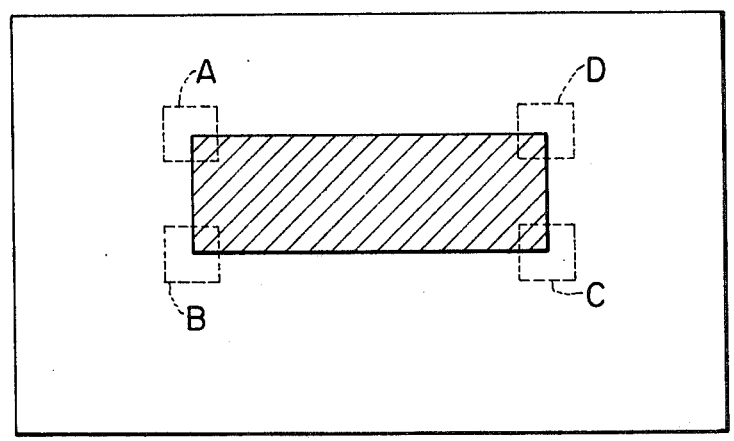
FIG. 2b   FIG. 2c   FIG. 2d
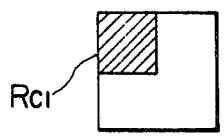 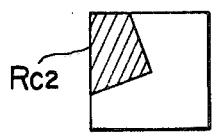 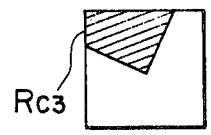

PATTERN RECOGNITION SYSTEM

BACKGROUND OF THE INVENTION

This invention relates to a pattern recognition system for detecting the shape and the position of an object, and more particularly to a pattern recognition system which can recognize an object having a complicated pattern.

Heretofore, a system for recognizing a specific pattern by scanning the pattern to produce a binary signal representative thereof has included means for storing signals representative of a plurality of specific patterns to be used as standard patterns and means for comparing in succession the input binary signal with the standard patterns stored in advance. When they coincide, the input signal at that time is judged to represent the specific pattern.

The prior art system, however, has a number of disadvantages as described hereunder. By way of example, reference is had to a case where a unidimensional input signal pattern, as shown in FIG. 1a, is to be recognized with the prior art system.

In order to recognize a specific pattern in the form of a binary representation $a$ from within a binary signal formed by binary bits 0 and 1, as illustrated in FIG. 1a, a binary representation of a standard pattern $b$ which is shown in FIG. 1b and which corresponds to the specific pattern $a$ to be recognized is employed, and the input signal shown in FIG. 1a and the binary representation of the standard pattern $b$ are compared at every bit position. If, as regards the position at which the standard pattern $b$ exists relative to the input signal, the regions $a$ and $b$ enclosed with broken lines in FIGS. 1a and 1b lie in the illustration relationship, the coincidence between the two can be immediately detected. However, when the standard pattern $b$ shifts rightwards or leftwards relative to the part $a$ of the input signal, the operation of comparing the input signal and the standard pattern must be repeated many times while shifting the standard pattern little by little until the positions of the part $a$ and the standard pattern $b$ come into coincidence. Alternatively, it is necessary to prepare a plurality of standard patterns whose positions are shifted little by little and to perform the process of comparing the plurality of standard patterns and the input signal.

In the above example, the former measure requires a long time for processing. The latter measure makes it necessary to store a plurality of standard patterns beforehand, which leads to the disadvantage of providing a memory of large capacity.

Problems in the prior art will now be described for a case where a two-dimensional specific pattern is recognized. Let's consider a system for recognizing a specific pattern in an object from a signal which is obtained from an image pickup device of, for example, an industrial TV camera. The specific pattern to be recognized is selected, for example, as a rectangular pattern shown as a hatched portion in FIG. 2a. In recognized such a rectangular pattern with the prior art system, four partial patterns, which are indicated as parts A through D enclosed with broken lines, and which are characteristic shapes of the rectangular pattern, are sampled, and whether or not they are in a proper positional relationship is investigated.

In order to sample the specific pattern in such a system, a standard pattern $R_{c1}$ as shown in FIG. 2b (the figure shows only the standard pattern which is employed for recognizing the partial pattern C) is stored beforehand, and the process of finding from within the object a part which coincides most with the stored standard pattern $R_{c1}$ is carried out.

In actuality, however, it is sometimes the case that the object to be picked up by the image pickup device is in a rotated and inclined state. In such a case, even when the partial pattern C is included in the object, it cannot be recognized using only the standard pattern $R_{c1}$ for the partial pattern C. Therefore, in order to make recognition possible even for such rotation of the object, standard patterns $R_{c2}$ shown in FIG. 2c, $R_{c3}$ shown in FIG. 2d, etc., with the standard pattern $R_{c1}$ rotated by predetermined angles are also prepared and stored beforehand together with the standard pattern $R_{c1}$ in the prior art system. Thus, the system can recognize the pattern of a rotated object.

The prior art system which needs to store such standard patterns $R_{c1}$ through $R_{c3}$ and possibly others in advance requires a memory of large capacity. Therefore, it is high in cost and complicated in processing function.

SUMMARY OF THE INVENTION

It is an object of this invention to provide a pattern recognition system which can recognize a specific pattern with high speed.

Another object of this invention is to provide a pattern recognition system which can recognize a specific pattern without the necessity for specifying the position of a specific pattern to be recognized.

Still another object of this invention is to provide a pattern recognition system which need not store standard patterns in a memory circuit.

In order to accomplish the object of this invention, the pattern recognition system of this invention cuts out a part or parts of a binary input signal by the use of a partial pattern cutting out system which has a plurality of cutting out windows previously provided in correspondence with a plurality of preselected regions in a specific pattern which respectively correspond to a characteristic part of the specific pattern to be recognized and which constitute patterns symmetric to each other. The EXCLUSIVE OR operations between the corresponding bits of the partial patterns obtained from a plurality of cutting out windows are performed by a plurality of EXCLUSIVE OR circuits. If the specific pattern is included in the signal supplied to the EXCLUSIVE OR circuits, all the EXCLUSIVE OR circuits provide outputs of level 1 in the positive logic because the plurality of cutting out windows are disposed in correspondence with the symmetric patterns in the specific pattern. Therefore, whether or not the cut out pattern is the characteristic part of the specific pattern can be known by judging if all the output signal levels of the EXCLUSIVE OR circuits are 1.

BRIEF DESCRIPTION OF THE DRAWINGS

FIGS. 1a and 1b are diagrams showing an example of a binary representation of a unidimensional pattern and an example of a binary representation of a standard pattern, respectively;

FIGS. 2a and 2b to 2d are diagrams showing an example of a two-dimensional pattern and examples of standard patterns, respectively;

DESCRIPTION OF THE PREFERRED EMBODIMENTS

It is a requirement of the present invention that the specific pattern intended to be recognized be partially or wholly made up of portions symmetric to each other.

This premise will be described in more detail by taking as an example the case of a unidimensional pattern represented by the binary information shown in FIG. 1a. The unidimensional pattern includes the signal pattern which is formed of two levels (1 and 0) of the binary signal of eight bits within the region enclosed with the broken lines a. The signal pattern has symmetric portions with the boundary passing between the fourth and fifth bits. This invention recognizes such a pattern.

In the above described example of a unidimensional pattern, the portion including the four bits of the first half of the pattern and the portion including the four bits of the latter half of the pattern are symmetric over the whole specific pattern. Generally speaking, however, if only the symmetric portions as stated above are included at a part of the specific pattern, the system of this invention can effect a recognition. Hereunder, the principle of the pattern recognition system of this invention for recognizing a unidimensional pattern will be explained.

Figure 3:
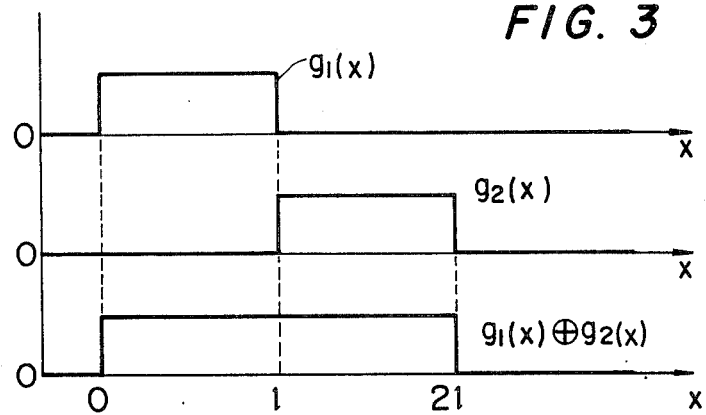
FIG. 3 is a diagram for elucidating the principle of a pattern recognition system according to this invention.

Assume now that the partial patterns of a specific pattern to be sampled are patterns $g_1(x)$ and $g_2(x)$ in which, as illustrated in FIG. 3, the level 1 or high level continues over $l$ bits.

That is, $$g_1(x) = \begin{cases} \text{"1"} & (0 \leq x < l) \\ \text{"0"} & (x < 0, x \geq l) \end{cases} \quad (1)$$

When a region from $x = 0$ to $x = 2l$ is considered, the partial patterns $g_1(x)$ and $g_2(x)$ are symmetric patterns with the boundary at $x = l$.

Therefore, the partial pattern $g_2(x)$ whose logic level is symmetric to that of $g_1(x)$ in a range of $0 \leq x \leq 2l$ can be given as follows:

$$g_2(x) = g_1(x-l) \quad (2)$$

The EXCLUSIVE OR operation between $g_1(x)$ and $g_2(x)$ of equations (1) and (2) (the operation is expressed by $g_1(x) \oplus g_2(x)$) becomes:

$$g_1(x) \oplus g_2(x) = \begin{cases} 1 & 0 \leq x < 2 \\ 0 & x < 0, x \geq 2 \end{cases} \quad (3)$$

This is illustrated in FIG. 3.

The partial patterns $g_1(x)$ and $g_2(x)$ are respectively cut out through a first cutting out window having a length of $l$ bits and a second cutting out window shifted by $l$ bits therefrom and having the same length of $l$ bits. The EXCLUSIVE OR operation between the corresponding bits of the partial patterns are effected. If the partial patterns $g_1(x)$ and $g_2(x)$ are superposed on the first and second cutting out windows, all the output levels of the respective bits from 0 to $2l$ in the outputs of the EXCLUSIVE OR circuits become 1 in the case of positive logic, so that the presence of the partial patterns $g_1(x)$ and $g_2(x)$ can be detected.

In order to more specifically explain the above described principle of this invention, description will now be made of a case where the recognition of the unidimensional pattern shown in FIG. 1a is conducted by the use of the system of this invention.

The pattern formed of the levels 1 and 0 in the region enclosed with the broken line a, i.e., the pattern 00111100 is a bilaterally symmetric pattern with the boundary at the middle between the fourth and fifth bit. Let it be supposed that the specific pattern to be recognized is 1111. The first four bits are assumed to be the partial pattern $g_1(x)$ described above, and the bits after the fourth bit are assumed to be the partial pattern $g_2(x)$. When the EXCLUSIVE OR operation between the corresponding bits of the partial patterns $g_1(x)$ and $g_2(x)$ are taken, all the exclusive OR values become 1 in the region of $0 \leq x < 2l$, and the specific pattern 1111 can be detected. Even if, in this example, the pattern 00111100 shifts leftwards or rightwards by two bits with respect to the region $a$ enclosed with the broken lines i.e., it becomes 11110000 or 00001111, the EXCLUSIVE OR operation between the first four bits and the following four bits become 1 for all the bit positions. Therefore, even if the specific pattern shifts rightwards or leftwards relative to the partial pattern cutting out windows (in the case of this example, the initial four bits and the terminal four bits correspond to the first and second windows, respectively), the specific pattern can be recognized.

Figure 4:
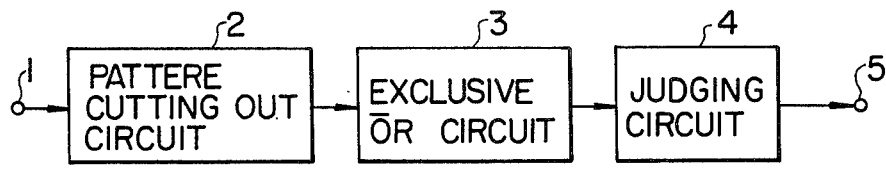
FIG. 4 is a schematic block diagram showing the principle construction of the pattern recognition system according to this invention.

FIG. 4 is a diagram which shows an example of the principle arrangement of this invention.

Numeral 1 designates an input terminal to which a binary input signal is applied. Numeral 2 designates a pattern cutting out circuit for cutting out the partial patterns $g(x)$ and $g_2(x)$ described above. Numeral 3 designates an EXCLUSIVE OR circuit for performing an EXCLUSIVE OR function between the corresponding bits of the partial patterns $g_1(x)$ and $g_2 x)$. A judging circuit 4 serves to judge if the output of the EXCLUSIVE OR circuit 3 coincides with a reference corresponding to a logic output which is obtained from the EXCLUSIVE OR circuit 3 when a specific pattern is previously applied to the input terminal 31. Shown at 5 is an output terminal, which provides the logic level 1 (in case of the positive logic) as an output when the input signal is the specific pattern.

Figure 5A:
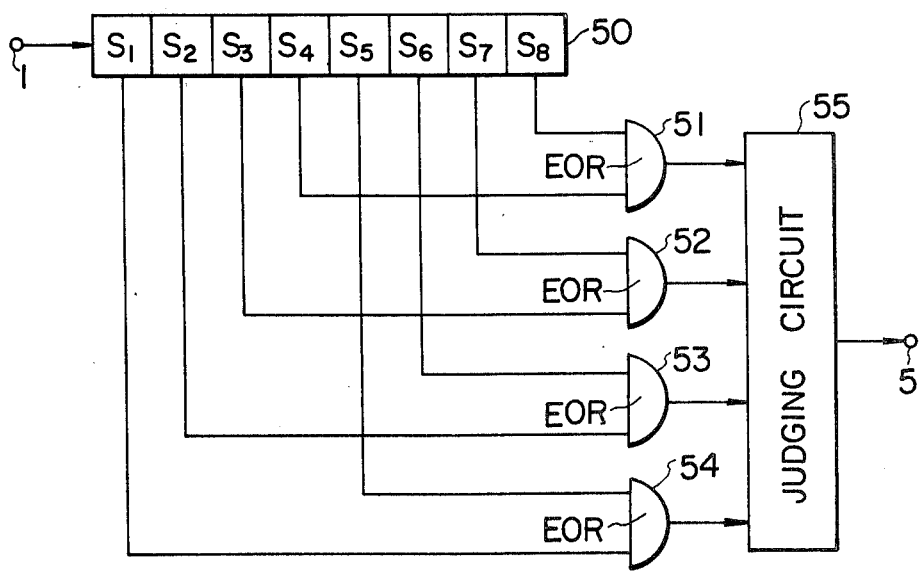
FIGS. 5a to 5c are schematic circuit diagrams each showing an embodiment of this invention for the purpose of recognizing a unidimensional pattern.

FIG. 5a is a circuit diagram of an embodiment of a specific arrangement where a unidimensional pattern is recognized in accordance with the pattern recognition system of this invention, as shown in FIG. 4.

Numeral 1 designated an input terminal to which a binary signal is applied. Shown at 50 is a partial pattern cutting out circuit, which in this example is composed of a shift register made up of eight stages $S_1$ through $S_8$. Numerals 51 and 54 denote EXCLUSIVE OR circuits, which are indicated by EOR in the figure. The EXCLUSIVE OR circuits 51 to 54 are so constructed as to perform an EXCLUSIVE OR operation on the bits stored in stages $S_4$ and $S_8$, $S_3$ and $S_7$, $S_2$ and $S_6$, and $S_1$ and $S_5$ of the partial pattern cutting out circuit 50, respectively. That is, they perform an EXCLUSIVE OR operation between the bits of the first partial pattern stored in stages $S_1$ to $S_4$ and those of the second partial pattern stored in stages $S_5$ to $S_8$. Assuming the specific pattern to be 00111100, when it is applied to the input terminal 1, bits 00111100 are stored in the respective stages $S_1$ to $S_8$ of the partial pattern cutting out circuit 50, i.e., the shift register. Therefore, all the outputs of the EXCLUSIVE OR circuits 51 to 54 present the level 1 in case of a positive logic.

Figure 6A:
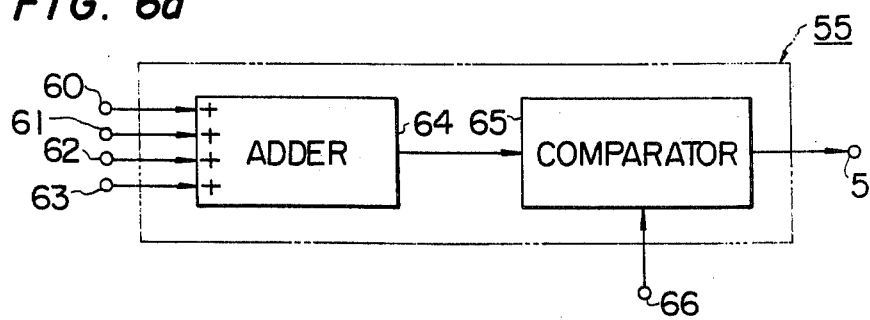
FIGS. 6a to 6b show examples of specific constructions of the judging circuit 55 in FIG. 5a FIGS. 7a to 7c are diagrams for elucidating the principle of the pattern recognition system of this invention in the case of recognizing a two-dimensional pattern.
Figure 6B:
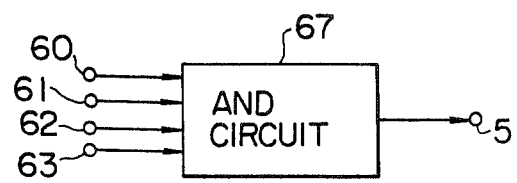

A judging circuit 55 judges the output levels of the EXCLUSIVE OR circuits 51 to 54, and it is constructed as shown in FIG. 6a or 6b. In the example of FIG. 6a, the output signals of the EXCLUSIVE OR circuits 51 to 54 are applied to input terminals 60 to 63, respectively. The signals applied to the input terminals 60 to 63 are added by an adder 64. The output of the adder 64 is compared in a comparator 65 with a reference signal which is applied to a reference input terminal 66. When the adder output and the reference signal coincide, the comparator 65 delivers a pulse to an output terminal 5.

When, assuming the specific pattern to be 00111100 as in the foregoing example, the binary signal is applied to the input terminal 1 (in FIG. 5a), all the output levels of the EXCLUSIVE OR circuits 51 to 54 become 1 as described previously, and hence, the output of the adder 64 has the value 4. On the other hand, a value 4 is applied to the reference input terminal 66 beforehand. In consequence, when the output signal of the adder 64 and the reference are compared by the comparator 65, an output indicative of the "coincidence" is obtained as a pulse at the output terminal 5 in the case of this example.

The judging circuit 55 can also have the arrangement of FIG. 6b in which the arrangement of FIG. 6a is further simplified. An AND circuit 67 has input terminals 60 to 63 to which the output signals of the EXCLUSIVE OR circuits 51 to 54 are applied, respectively. As in the preceding example, when the binary signal representing the specific pattern is applied to the input terminal 1 in FIG. 5a, a pulse signal can be obtained as an output indicative of the "coincidence" at an output terminal 5 of the AND circuit 67.

Another embodiment will now be described concerning a construction of the pattern recognition system of this invention designed for the purpose of recognizing a unidimensional pattern.

The partial pattern cutting out circuit 50 shown in FIG. 5a is suitable where 00111100 is the specific pattern. It is the characteristic of the specific pattern that the logic level 1 continues by four. Hereunder, let's consider a case where the specific pattern is 00110011100. In this specific pattern, it is a characteristic that the logic level 1 exists at the third and fourth bits and at the seventh and eighth bits. When the first four bits and the last four bits are respectively detected as partial patterns, these two partial patterns are symmetric to each other. In this manner, there is a case where the characteristic parts of the specific pattern exist inconsecutively as in the present example in contrast to the binary signal in which the partial patterns exist consecutively as in the previous example.

Figure 5B:
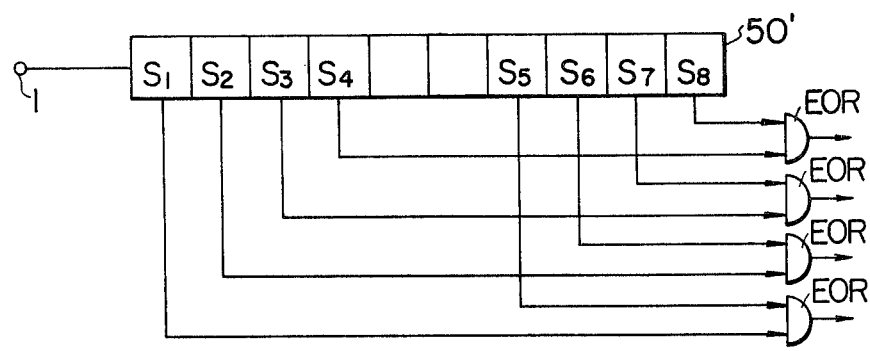

For such a specific pattern as in the present example, the partial pattern cutting out circuit may be constructed as shown at 50' in FIG. 5b. More specifically, the partial pattern cutting out circuit 50' is constructed of a shift register so as to provide outputs from stages $S_1$ to $S_4$ in correspondence with the first four bits of the specific pattern 0011001100 of the present example and outputs from stages $S_5$ to $S_8$ in correspondence with the last four bits thereof. The fifth bit and the sixth bit of the shift register have no output terminal. The signals respectively stored in $S_1$ to $S_8$ of the shift register are applied to the EXCLUSIVE OR circuits as shown in FIG. 5a, and the subsequent signal processings are conducted in the same way as in the operation in FIG. 5a. Thus, the recognition of the specific pattern can be effected.

Description will now be made of a case where the pattern recognition system of this invention is used for the recognition of a specific pattern such as 001110001 in which partial patterns symmetric to each other overlap. In the case of this example, the first six bits and the last six bits are 0011100 and 110001, respectively. The patterns of 0 and 1 are symmetric to each other. Moreover, these patterns overlap at the fourth to sixth bits.

Figure 5C:
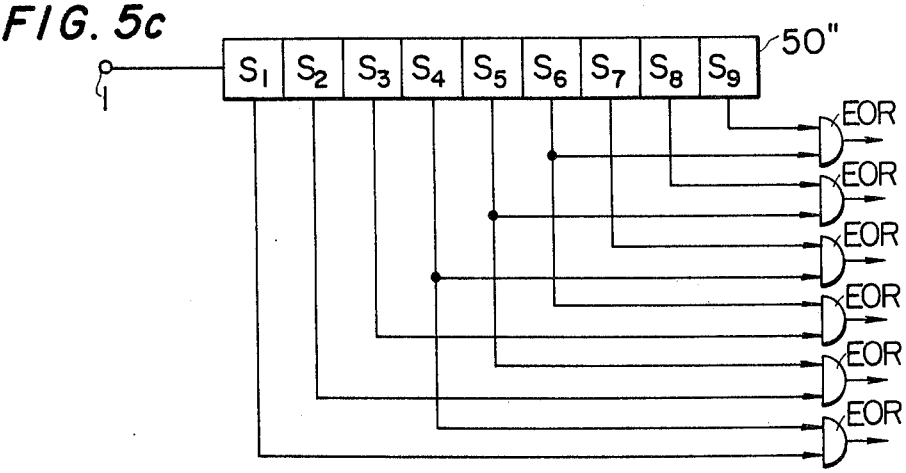

The partial pattern cutting out circuit in the case of recognizing such a pattern (specific pattern) may be constructed as shown at 50" in FIG. 5c. A shift register of nine stages is provided. Portions for deriving outputs of the fourth to sixth bits, i.e., stages $S_4$ to $S_6$ are divided in two. Thus, the outputs are derived so that the EXCLUSIVE OR operations between the corresponding bits of the outputs $S_1$ to $S_6$ corresponding to the first partial pattern $g_1(x)$ and the outputs $S_4$ to $S_9$ corresponding to the second partial pattern $g_2(x)$ can be executed. The outputs of the partial pattern cutting out circuit 50" are applied to the EXCLUSIVE OR circuits in the same way as in FIG. 5a. and the required number of EXCLUSIVE OR circuits is six in the case of this example. Where the arrangement shown in FIG. 6a is adopted for the judging circuit 55, the value 6 is adopted as The reference signal to be applied to the reference input terminal 66. Thus, the specific pattern 001110001 in the present example can be recognized.

In the above, the pattern recognition system of this invention has been described in detail in conjunction with specific embodiments for recognizing unidimensional patterns. Now, a case of recognizing a two-dimensional pattern with the system of this invention will be described in detail. The principle of this invention has been explained previously with reference to FIG. 3. In order to apply the principle of a two-dimensional pattern, this principle will be described more in detail with reference to FIGS. 7a to 7c.

Figure 7A:
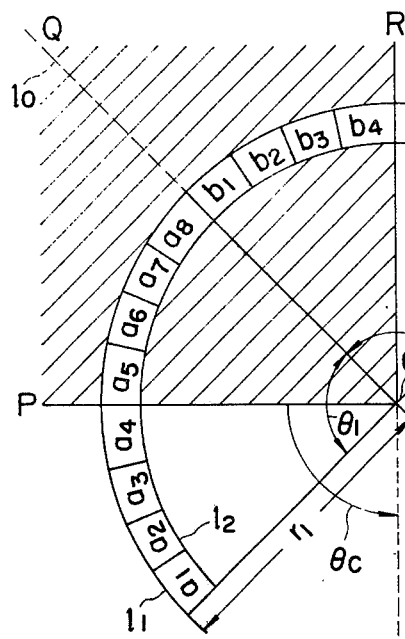

In FIG. 7a the hatched portion indicates a specific pattern. In case of this example, it is a right-angled pattern POR whose vertex is $\overline{O}$. In order to recognize such a pattern, partial patterns are cut out, and the EXCLUSIVE OR function of brightness levels between corresponding picture elements of the partial patterns are obtained (in the case of the present example, the brightness level corresponding to the hatched portion is made 1 and that corresponding to the other area or background 0). Hereunder, the manner of cutting out the partial patterns will be described in detail.

The pattern is designed by the brightness levels of the picture elements on a circumference whose center is the vertex $\overline{O}$ and whose radius is $r_1$. Let $a_1$–$a_8$ denote the brightness levels of the picture elements on the circumference of a sector which extends by an angle $\theta_1$ about the vertex $\overline{O}$, whose radiux is $r_1$ and whose center line is $\overline{OP}$, respectively. In this case, notice is taken of the picture elements, and the picture elements have areas. Therefore, the words "picture elements on the circumference of the radius $r_1$" are, exactly, picture elements containing points on the circumference of the radius $r_1$, which are picture elements within a region held between curves $l_1$ and $l_2$ in FIG. 7a. In general, however, the area of each picture element is negligly small relative to an object. Therefore, although the drawing exaggeratedly depicted the picture elements in order to facilitate understanding of the principle of this invention, the brightness levels of the picture elements on the circumference of the radius $r_1$ may, in actuality, be regarded as corresponding to $a_1$ to $a_8$.

The object has a part of the specific pattern from $a_1$ to $a_8$ superposed exactly on windows corresponding to $a_1$ to $a_8$, and a pattern 00001111 is cut out. This becomes the partial pattern $g_1(x)$.

Figure 7B:
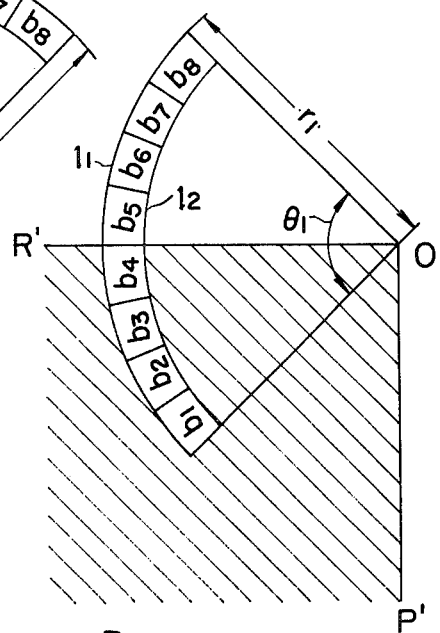

Subsequently, the partial pattern $g_2(x)$ is cut out on the basis of the relation of equation (2). Herein, as shown in FIG. 7b, while holding the position of the partial pattern cutting out windows, the specific pattern OPR is rotated by 90° and the point $\overline{O}$ to make it a specific pattern OP'R'. As in the case of $g_1(x)$, the brightness levels of picture elements obtained from partial pattern cutting out windows are evaluated as $b_1$ to $b_8$, i.e., 11110000. Thus, the partial pattern $g_2(x)$ can be acquired.

Since, however, it makes the system complicated to actually rotate the object, this invention proposes here to compare FIG. 7a and FIG 7b. The brightness levels $b_1$ to $b_8$ of the picture elements obtained from the partial pattern cutting out windows in FIG. 7b are quite the same as the brightness levels $b_1$ to $b_8$ of picture elements obtained by taking notice of the picture elements on the circumference of a sector having a center line $\overline{OR}$, a radius $r_1$ and an angle $\theta_1$ in FIG. 7a. Therefore, the brightness levels of the picture elements on the circumferences of the sectors of the radius $r_1$ and the angle $\theta_1$ as respectively have the center line $\overline{OP}$ and $\overline{OR}$ in FIG. 7a are sampled for the pair of partial patterns in the case of recognizing the two-dimensional pattern by this invention.

In the above, description has been made of an exemplary manner of cutting out the partial patterns in the case where a simple right-angled pattern is recognized by the system of this invention. In recognizing a specific pattern, however, it is sometimes necessary to distinguish the shape of the hatched portion POR in FIG. 7a and the shape of a hatched portion E as shown by way of example in FIG. 7c. The distinguishing features between the shapes of the specific pattern POR and the hatched portion E as in the case of the present example is achieved by a measure stated below. The pair of partial patterns are cut out through the windows of the sectors of the radius $r_1$ as described above. Simultaneously therewith, windows of sectors having a radius $r_2$ in place of the radius $r_1$ are further provided, and partial patterns composed of elements $c_1 - c_4$ and $d_1 - d_4$ are obtained. The EXCLUSIVE OR operation between $c$ and $d$ is effected.

Figure 7C:
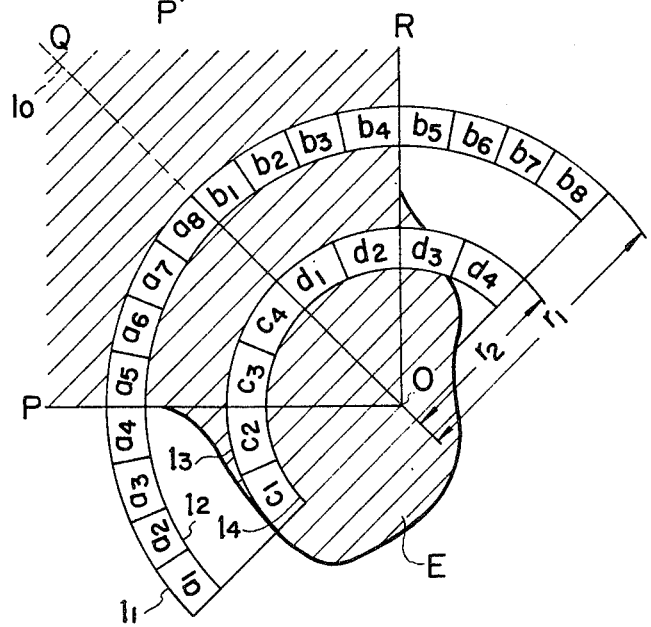

Now, a modification will be explained concerning the way of cutting out partial patterns, reference being had to FIG. 8a. An example shown in FIG. 8a corresponds to a case of recognizing a right side part of a pattern 80, as shown in FIG. 8b. In the description thus far made, notice is taken of the picture elements on the circumferences of the sectors respectively corresponding to the plurality of regions in which the characteristic parts of the specific pattern are symmetric to each other, and the partial patterns are cut out. In contrast, in the example shown in FIG. 8a, notice is taken of the brightness levels of picture elements in a certain specified region of the pattern. That is, notice is taken of the fact that the patterns of the brightness levels of the right side part of the pattern 80 in FIG. 8b as shown by a hatched portion and the surrounding region are symmetric between sector regions UOV and U'OV' of < UOV = < U'OV' = $\theta_2$. Picture elements $a_1$ to $a_{64}$ of a region within the sector UOV are sampled as the partial pattern $g_1(x)$, while picture elements $b_1$–$b_{64}$ of a region within the sector U'OV' are sampled as the partial pattern $g_2(x)$. To cut out the partial patterns by detecting all of the picture elements of the certain region in this manner corresponds to the limit state of the case of searching for the partial patterns by changing the radius $r$ to $r_1$ and $r_2$ as illustrated in FIG. 7c. The process after cutting out the partial patterns are quite the same as in the foregoing.

Figure 9:
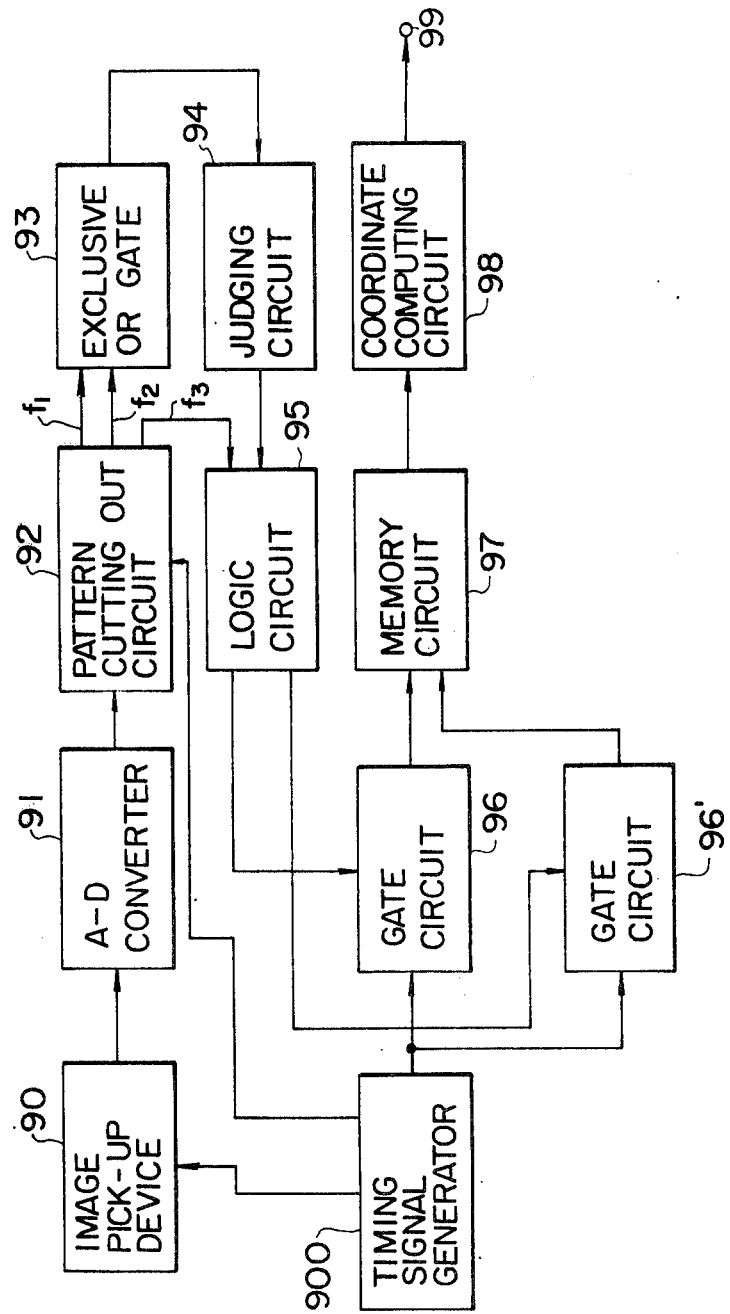
FIG. 9 is a schematic block diagram showing an embodiment of the pattern recognition system of this invention for recognizing a two-dimensional pattern.

Hereunder, the pattern recognition system of this invention will be described in detail in connection with an embodiment thereof. FIG. 9 is a diagram showing the embodiment of this invention in the case where a two-dimensional pattern is recognized by the use of an image pickup device, such as an industrial TV camera. Numeral 90 designates an image pickup device, such as industrial TV camera, which serves to convert an object into an electric signal unidimensional with respect to a time axis. The unidimensional electric signal of the image pickup device 90 is obtained by scanning the object at a fixed period as in a conventional TV camera. An output signal of the image pickup device 90 is applied to an A-D converter 91 and is binary-coded therein. The binary-coded signal is subsequently applied to a pattern cutting-out circuit 92. An example of the detailed construction of the pattern cutting-out circuit 92 is shown in FIG. 11.

Figure 8A:
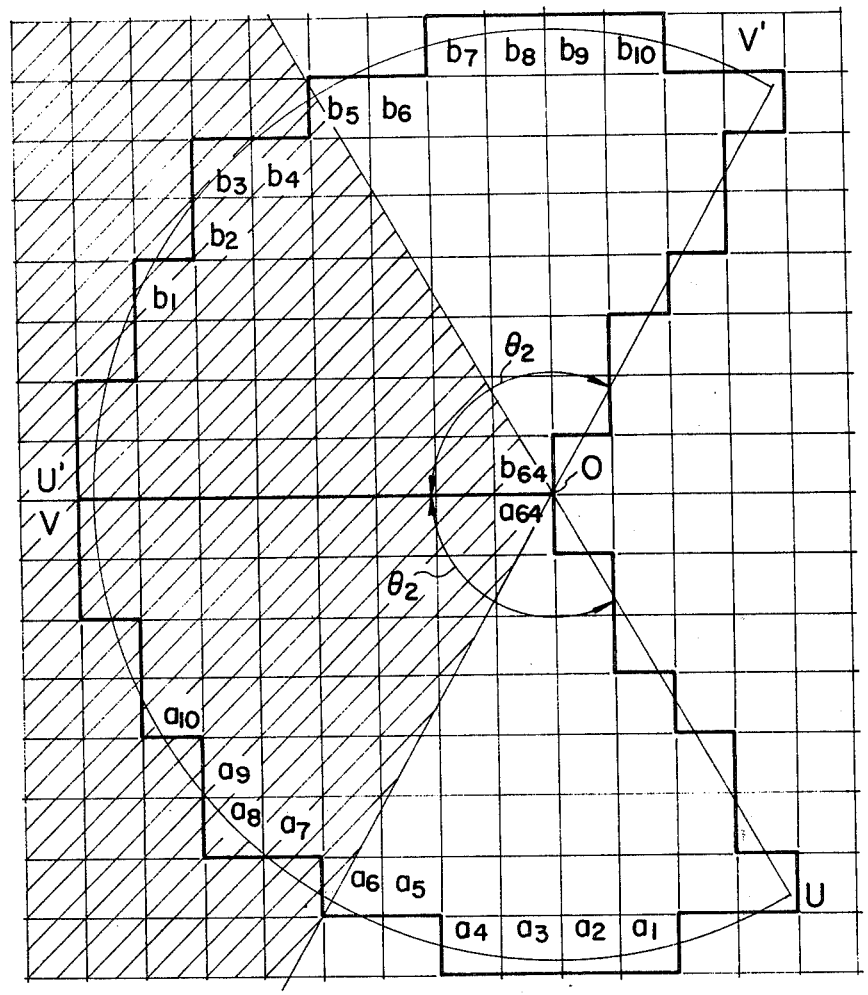
FIGS. 8a is a diagram for elucidating the specific way of cutting out a partial pattern and FIG. 8b is a diagram showing an example of a two-dimensional pattern.
Figure 8B:
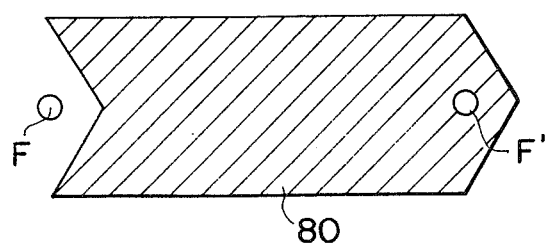
Figure 10:
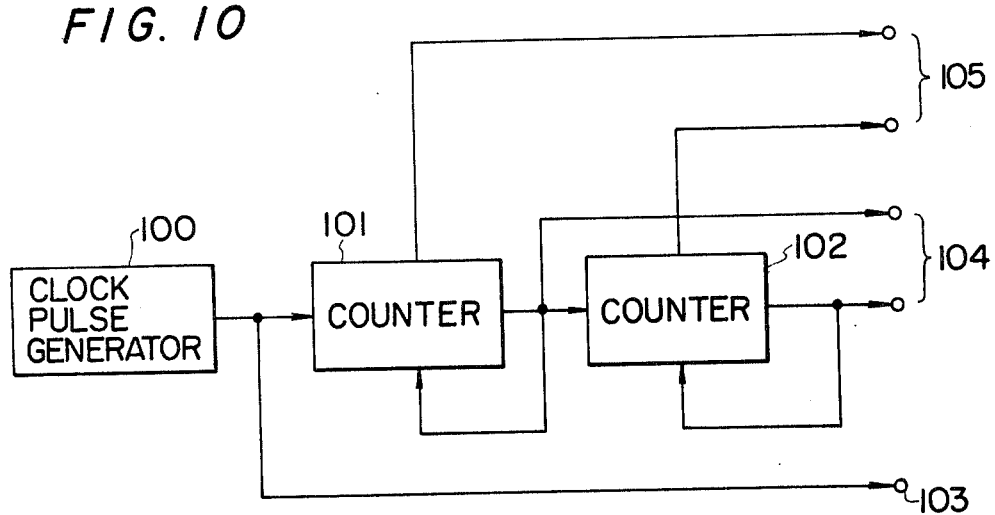
FIG. 10 is a schematic block diagram showing an example of a specific construction of the timing signal generator 900 in FIG. 9.
Figure 11:
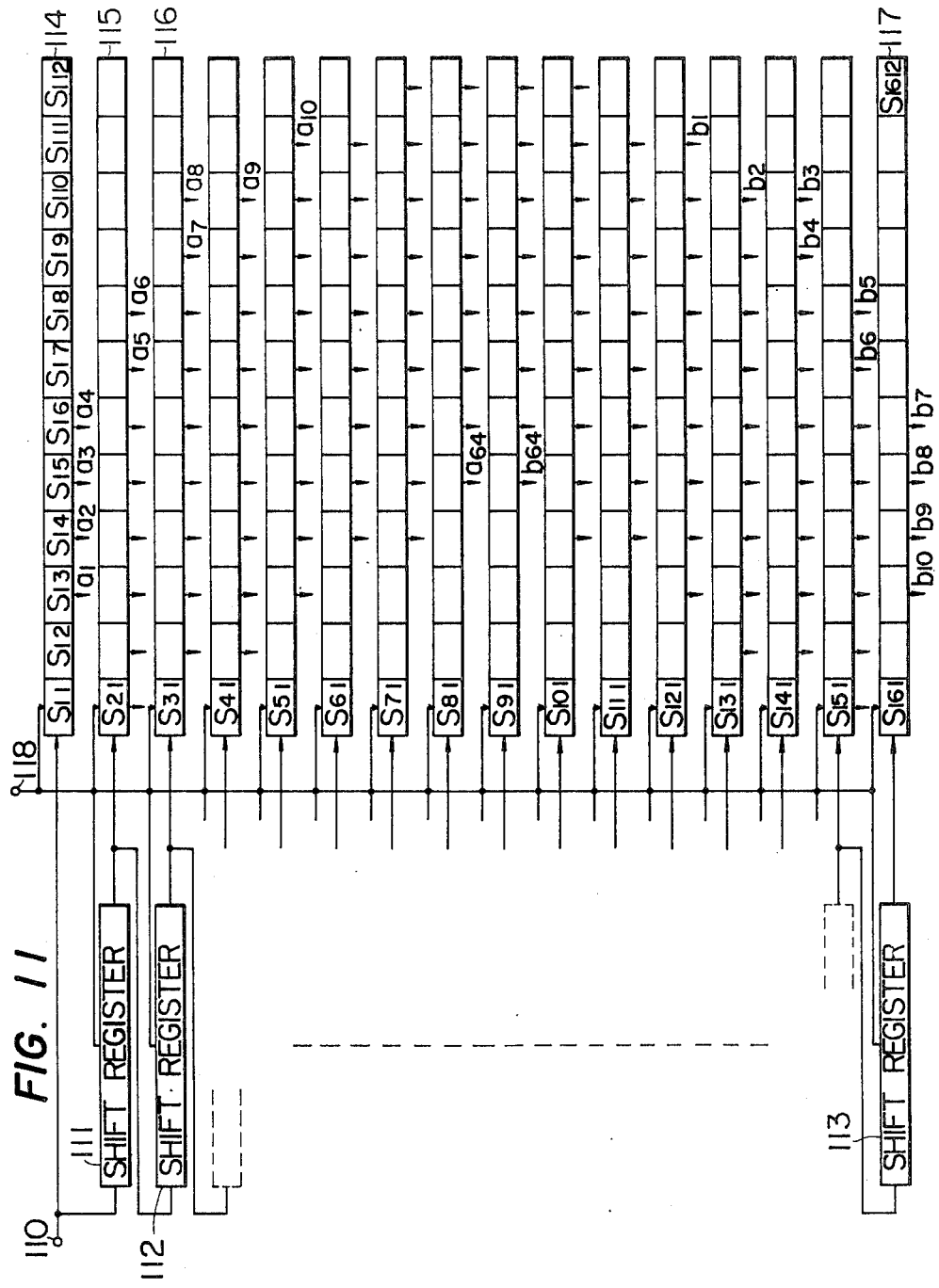
FIG. 11 is a schematic block diagram showing an example of a concrete construction of the pattern cutting-out circuit 92 in FIG. 9.

The pattern cutting-out circuit shown in FIG. 11 is a specific example of the way of cutting out the partial patterns shown in FIG. 8a The pattern cutting-out circuit 92 is composed of shift register 111–113 which have a memory capacity for storing all the picture elements of the object and which are connected in series, and 16 12-bit shift registers 114–117 which have a memory capacity for storing all the elements of regions intended to be cut out from the respective shift registers 111–113 and which are respectively connected in series with the shift registers 111–113. The shift registers 111–113 and 114–117 are operated by being synchronized by timing pulses which are applied from a timing pulse input terminal 118. The timing pulses are generated by a timing signal generator 900, and an example of the detailed construction thereof is shown in FIG. 10.

Clock pulses are provided by a clock pulse generator 100. The output clock pulses are applied to a counter 101, and are directly supplied to the timing pulse input terminal 18 in FIG. 11 via an output terminal 103. Further, outputs of the counter 101 are applied to a counter 102 and counted down. Here, the clock pulse generator 100 is a generator of 6 MHz. The counter 101 is so constructed as to provide one pulse when it has counted 382 input pulses, and the counter 102 is so constructed as to provide one pulse when it has counted 262 input pulses.

That is, the operation of the counter 101 is such that it counts the output pulses of the clock pulse generator 100 oscillating at 6 MHz and that when it has counted 382 pulses, it delivers the pulse to reset itself and to simultaneously apply a pulse to the counter 102. In addition, the output signal of the counter 101 is employed as a driving pulse in the horizontal direction of the image pickup device 90. The counter 102 operates to count the output pulses of the counter 101, and when it has counted 262 pulses, it delivers the pulse to reset itself and to simultaneously deliver the pulse to an output terminal 104 together with the output of the counter 101 for the drive in the vertical direction of the image pickup device. On the other hand, the count valve in the state in which the counter(s) 101 and/or 102 are (is) counting is fed to an output terminal 105, and is entered into gate circuits 96 and 96' to be described later.

Referring back to FIG. 11, the operation of the partial pattern cutting-out circuit will be explained. As previously stated, the shift registers 114 to 117 have a memory capacity sufficient to store the picture elements of the regions of the object which correspond to the partial patterns to be cut out. There are so constructed that the respective bits of the shift registers 114–117 which correspond to $a_1$–$a_{64}$ and $b_1$–$b_{64}$ in FIG. 8a provide therefrom logic levels stored in the bits (in the figure, the output logic levels are indicated by arrows from the respective bits). That is, the bits of the shift registers are caused to correspond to the elements of the sector UOV in FIG. 8a, for example, the bit $S_{13}$ is caused to correspond to the element $a_1$ and the bit $S_{14}$ to the element $a_2$, and the same applies to the sector U'OV'. Thus, the partial pattern cutting-out windows are constructed. The terminals from which $a_1$–$a_{64}$ are provided as outputs constitute the first window, and those from which $b_1$–$b_{64}$ are provided as outputs constitute the second window. By adopting the construction as stated above, the partial patterns can be cut out by using as the windows the two regions of the sectors UOV and U'OV' shown in FIG. 8a and while shifting the object in succession. When the object pattern stored in the shift registers 114 to 117 within the partial pattern cutting-out circuit coincides with the hatched portion in FIG. 8a, the presence of the specific pattern can be detected by conducting precessings to be described hereunder.

Referring back to FIG. 9, the following description will be made. Let $f_1$ and $f_2$ denote signals of the two groups $a_1$–$a_{64}$ and $b_1$–$b_{64}$ which are obtained in correspondence with the regions of the sectors UOV and U'OV' obtained from the pattern cutting-out circuit 92. The signals $f_1$ and $f_2$ are applied to an EXCLUSIVE OR gate 93 in order to perform the EXCLUSIVE OR operations between picture elements whose logic levels are symmetric in the specific pattern (for example, between $a_1$ and $b_1$, $a_2$ and $b_2$ ... $a_{64}$ and $b_{64}$). Here, the EXCLUSIVE OR function between the signals $f_1$ and $f_2$ is effected. In a judging circuit 94 at the next stage, whether or not the partial pattern cut out corresponds to the specific pattern is judged.

Figure 12:
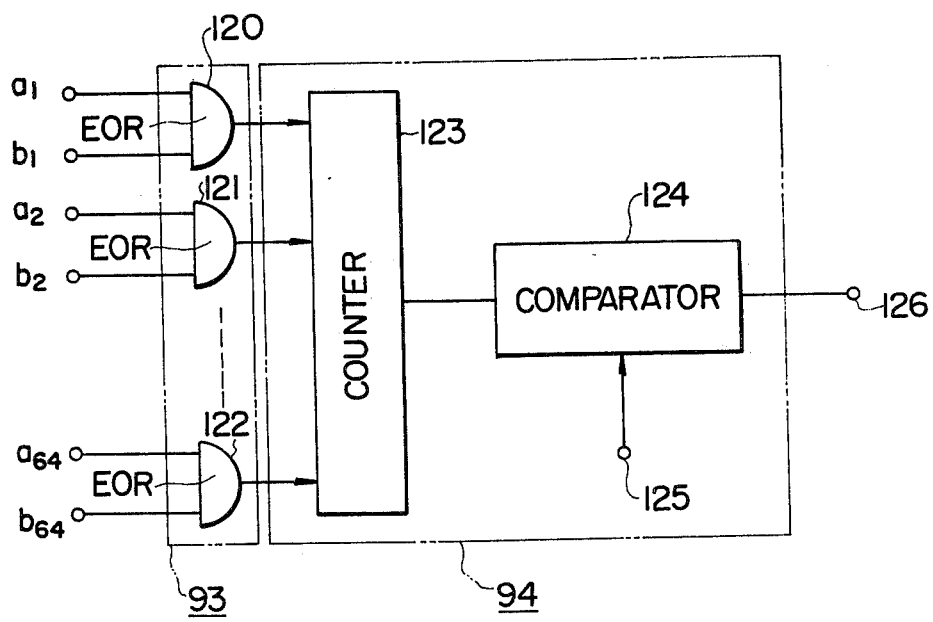
FIG. 12 is a schematic block diagram showing an example of a specific construction of the exclusive OR gate 93 as well as the judging circuit 94 in FIG. 9.

An example of the specific construction of the EXCLUSIVE OR gate 93 and the judging circuit 94 is shown in FIG. 12, wherein the signal $f_1$ corresponding to $a_1$–$a_{64}$ in FIG. 8a and the signal $f_2$ corresponding to $b_1$–$b_{64}$ are applied to EXCLUSIVE OR gates 120–122 in such a manner that the corresponding bits are led to the same gate. By way of example, assume that the signals $f_1$ and $f_2$ cut out are signals obtained in a case where, as shown in FIG. 8a, they just coincide with the characteristic parts of the specific pattern shown by the hatched portion with respect to the partial cutting out window. Then, all the outputs of the EXCLUSIVE OR gates 120–122 become 1 in the case of positive logic. The total of the output signals is evaluated by a counter 123. It is compared in a comparator 124 with a reference signal applied to a reference signal input terminal 125. Then, a coincidence output is provided from an output terminal 126 of the comparator 124. As the reference signal, the valve 64 is used in case of the present example. As illustrated in FIG. 6b, as the judging circuit in the previous case of conducting the recognition of the unidimensional pattern, the judging circuit 94 can be constructed of an AND circuit also in the case of the present example.

By observing the output signal of the judging circuit 94, the pattern having the angle of 120° as shown in FIG. 8a can be detected. However, the patterns, in which, as in the specific pattern shown in FIG. 8b, the right side and left side patterns are converse with respect to the brightness levels thereof, cannot be discriminated by only the operations thus far described. Therefore, in order to recognize the specific pattern 80 the patterns on the right and left of the specific pattern 80 need be further distinguished. Circuits at stages following the judging circuit 94 in FIG. 9 serve to effect this function.

More specifically, in order to discriminate in the presence of the output of the judging circuit 94 whether it is the pattern on the right side or left side of the specific pattern, a third partial pattern of a region corresponding to a region F or F' in FIG. 8b is cut out as a signal $f_3$ from the partial pattern cutting-out circuit 92. The discrimination between the right and left of the specific pattern is also performed on the basis of the third partial pattern and the output of the judging circuit 94.

Generally speaking, the third partial patterns F, F' may correspond to regions which lie in the vicinity of the partial patterns corresponding to two characteristic parts of the specific pattern which are converse in brightness level and whose brightness levels differ from each other in the specific pattern. As regards the manner of cutting out, it is cut out from the region corresponding to, for example, the position F or F' in FIG. 8b in the shift registers 114 to 117 in FIG. 11.

Figure 13:
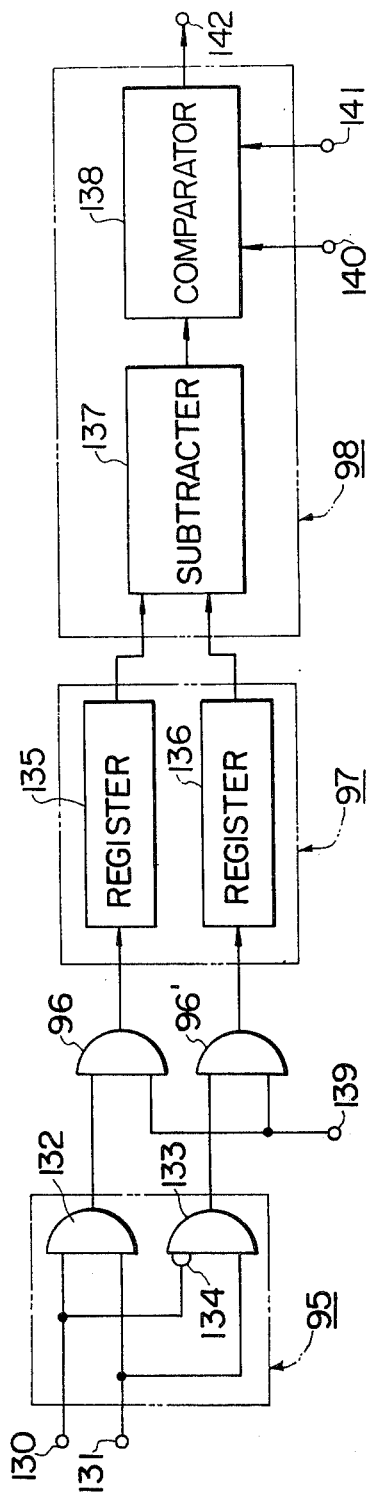
FIG. 13 is a schematic block diagram showing an example of a specific construction of the logic circuit 95, gate circuits 96 and 96', memory circuit 97 and coordinate computing circuit 98 in FIG. 9.

The connecting relationship in the pattern recognition system of this invention among a logic circuit 95, gate circuits 96 and 96', a memory circuit 97 and a coordinate computing circuit 98 is as shown in FIG. 9. The construction of the circuitry following the logic circuit 95 is pointed out in FIG. 13, and the specific arrangement thereof and operation will be explained hereunder. As shown in FIG. 13, the judging circuit 95 has an input terminal 130 to which the logic level of the third partial pattern $f_3$ is applied, and an input terminal 131 to which the output signal of the judging circuit 94 is applied. The signals respectively applied to the input terminals 130 and 131 are applied to an AND circuit 132 and an INHIBIT GATE circuit 133. Shown at 134 is a negation input terminal of the INHIBIT GATE circuit 133. Assuming here that the partial patterns $f_1$ and $f_2$ cut out by the partial pattern cutting-out circuit are the part corresponding to the right side of FIG. 8b, the signal $f_3$ of logic level 1 corresponding to the third partial pattern F' is applied to the input terminal 130. Therefore, the output of the AND circuit 132 becomes 1, while that of the INHIBIT GATE circuit 133 becomes 0.

On the other hand, the gate circuits 96 and 96' are constructed of AND circuits, respectively. One input terminal of each of the AND circuits 96 and 96' receives the corresponding one of the output signals of the AND circuit 132 and the INHIBIT GATE circuit 133, while the other input terminal 139 receives the address in the x-axial (horizontal) direction from the timing signal generator 900, i.e., the output signal of the counter 101 in FIG. 10. Since the specific pattern 80 in the present example has characteristic parts which present the converse patterns in the horizontal direction, only the count value of the counter 101 in the x-direction may be applied to the input terminal 139 in FIG. 13. Where the specific pattern rotates by 90° and is situated longitudinally in the vertical direction, the address in the Y direction or the count value of the counter 102 may be applied to the input terminal 139.

In the ensuing explanation of FIG. 13, it is supposed that, as the signal applied to the input terminal 139, the count value of the counter 101 of the timing signal generator 900 in FIG. 10 is applied through the terminal 105. That is, it is supposed that the count value of the counter 102 is not received.

Consider the case where, as previously exemplified, the right side of the specific pattern 80, i.e., the side on which the third partial pattern F' exists is cut out. Then, the AND circuit 96 allows the signal received at the terminal 139 to pass therethrough, whereas the AND circuit 96' operates so as to prevent the passage of the signal. That is, the AND circuit 96 operates so as to supply to the register 135 of the memory circuit 97 the count value of the counter 101 at the time when the AND circuit 132 has the output of level 1, i.e., the horizontal (x) direction address value at that time.

On the other hand, suppose that the other cut out corresponds to the left side of the specific pattern 80, i.e., the side on which the third partial pattern F exists. Then, conversely to the foregoing, the INHIBIT GATE circuit 133 has an output of level 1, and the count value of the counter 101, i.e., the x-direction address value is supplied to the register 136 through the AND circuit 96'. The coordinate computing circuit 98 has a subtractor 137, which evaluates the difference between the values stored in the registers 135 and 136. That is, the subtractor 137 operates to evaluate the difference of the address values or the distance in the x-direction between the third partial patterns F and F'. The value evaluated by the subtractor 137 is compared in a comparator 138 with a reference signal which represents the distance between the third partial patterns F and F' of the specific pattern 80, as previously known. When they coincide, a pulse is provided at an output terminal 142. Regarding the reference signal, actually the count value of the counter 101 involves an error when the third partial pattern is cut out. Therefore, once one value has been set as the reference signal, there is the problem that no margin can be held. In the embodiment shown in FIG. 13, accordingly, in setting the distance L between the third partial patterns F and F', a value L' endowed with some margin $\Delta l$ is employed. That is, $$L' = L \pm \Delta l \tag{4}$$

Therefore, the upper limit value and the lower limit value are set with a certain width for the reference signal, and the respective values are applied to reference signal input terminals 140 and 141 of the comparator 138. That is, $$\left. \begin{array}{l} \text{upper limit value} = L + \Delta l \\ \text{lower limit value} = L - \Delta l \end{array} \right\} \tag{5}$$

If the value of the input signal of the comparator 138 lies between the upper limit value and the lower limit value of equation (5), the pulse is provided at the output terminal 142.

In the above, the embodiment in the case of recognizing the specific pattern 80 shown in FIG. 8b has been explained with reference to FIG. 9. The pattern recognition system of this invention can recognize a specific pattern in cases other than the above case of the ideal state, i.e., the state in which the specific pattern 80 is not inclined with respect to the image pickup plane of the image pickup device 90.

Description will be made of a case of recognizing the right side part of the specific pattern 80. Even if the pattern rotates in a range of ± 60° about the point $\overline{O}$ in FIG. 8a, the partial patterns cut out in correspondence with the two regions of the sectors UOV and U'OV' become patterns converse to each other. Therefore, the pattern can be recognized by the system of this invention. Even in the case where the object pattern inclines by an angle ± θ with respect to the image pickup plane of the image pickup device 90, the system of this invention can recognize it as described above. In this case, as the reference signal representative of the distance between the third partial patterns F and F' given by the coordinate computing circuit 98, the following may be set:

$$\left.\begin{array}{l}\text{upper limit value} = (L + \Delta l)\cos\theta \\ \text{lower limit value} = (L - \Delta l)\cos\theta\end{array}\right\} \quad (6)$$

Figure 14:
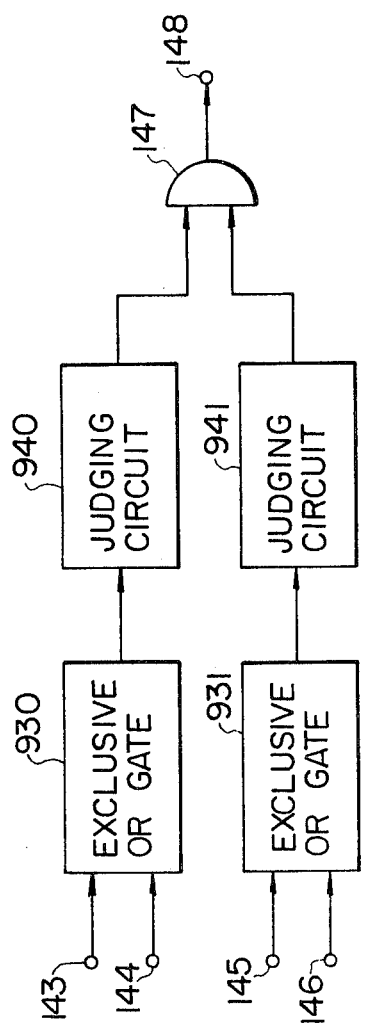
FIG. 14 is a block diagram showing essential portions in another embodiment of this invention.

In the above, the embodiment of this invention in the case of employing the partial pattern cutting-out method illustrated in FIG. 8a has been described in detail. An embodiment in the case of employing the partial pattern cutting-out method illustrated in FIG. 7c will be explained as to its essential portion with reference to FIG. 14. The essential portions of the pattern recognition system shown in FIG. 14 show a construction for carrying out processings after the four kinds of partial patterns $a_1-a_8$, $b_1-b_8$, $c_1-c_4$ and $d_1-d_4$ of the regions of the radii $r_1$ and $r_2$, i.e, the regions held between the curves $l_1$ and $l_2$ and those $l_3$ and $l_4$ in FIG. 7c have been cut out in the shift registers 114–117 of the pattern cutting-out circuit shown in FIG. 11 through the windows corresponding to the four kinds of partial patterns.

The four partial patterns are applied to the input terminals 143–146. The EXCLUSIVE OR functions between the partial patterns $a_1-a_8$ and $b_1-b_8$ and those $c_1-c_4$ and $d_1-d_4$ are evaluated by EXCLUSIVE OR gates 930 and 931. Judging circuits 940 and 941 constructed as shown in FIG. 6a or 6b judge whether or not the cut-out patterns are the partial patterns of the specific pattern. Assuming that the partial patterns of the specific pattern are cut out, the judging circuits 940 and 941 provide pulses, respectively. An AND function performed in the circuit 147, and a coincidence output is provided from an output terminal 148. If the cut-out partial patterns are a part corresponding to the hatched portion E in FIG. 7c, the pulse is provided from the judging circuit 940, but it is not provided from the judging circuit 941. Therefore, no pulse appears at the output terminal 148, and the situation can be distinguished from the above case where the partial patterns of the specific pattern are cut out.

According to this invention as desribed above, even when the specific pattern shifts to some extent relative to the partial pattern cutting-out window, the presence of the specific pattern can be recognized. Moreover, the necessity in the prior art for previously storing the reference patterns corresponding to the specific patterns in the memory circuit is eliminated. The invention can provide such a pattern recognition system which is high in the recognizing performance and whose circuit scale can be made smaller than in the prior art system.

In the embodiments described, several specific examples of a unidimensional pattern and a two-dimensional pattern have been given as the specific patterns. However, this invention is not restricted to these specific patterns, but is applicable to any pattern which has symmetric partial pattern portions partially or wholly. It is a matter of course that the constructions of the embodiments can be modified within a scope of this invention as defined in the following claims.

What is claimed is:

1. A pattern recognition system for recognizing a specific pattern having at least first and second symmetrical portions from a binary representation of a subject pattern, comprising first means for detecting those portions of binary signal representing the subject pattern which are located at the positions of said first and second symmetrical portions in the pattern to be recognized.

second means responsive to said first means for effecting an EXCLUSIVE OR operation between said detected pattern portions, and third means responsive to the output of said second means for indicating whether the signal obtained from said second means designated recognition of said specific pattern.

2. A pattern recognition system according to claim 1 wherein said first means comprises memory means for storing said binary signal and detection means for detecting the binary data stored in those portions of said memory means at which the data relating to said first and second symmetrical pattern portions are stored.

3. A pattern recognition system according to claim 2 wherein said second means comprises a plurality of EXCLUSIVE OR gates each receiving input signals made up of a corresponding bit from each of said portions of said memory means storing said first and second symmetrical pattern portions.

4. A pattern recognition system according to claim 3 wherein said third means comprises addition means for adding the output signals of said second means, and comparison means connected to said addition means for comparing the value of the output signal of said addition means and a reference value determined from said specific pattern.

5. A pattern recognition system according to claim 3 wherein said third means comprises an AND circuit for performing an AND logic operation on the output signals of said second means.

6. A pattern recognition system according to claim 1, further comprising fourth means coupled to said third means for distinguishing first and second types of patterns corresponding to characteristic parts of said specific pattern, said first and second types of patterns being identified by said third means and being converse to each other.

7. A pattern recognition system according to claim 6, wherein said fourth means comprises an AND circuit and an INHIBIT circuit connected to perform AND and INHIBIT logic operations, respectively, between signals corresponding to a third partial pattern cut out from said first means and signals obtained from said third means.

8. A pattern recognition system according to claim 6, further comprising fifth means connected to said fourth means for calculating the distance between said first and second types of patterns corresponding to the characteristic parts of said specific pattern from coordinates ot the partial patterns at the time when an output signal is obtained from said fourth means and for judging if the calculated value is equal to the corresponding distance of said specific pattern.

9. A pattern recognition system according to claim 8, wherein said fifth means comprises first and second gate means for gating signals representative of coordinates of the partial patterns cut out with two output signals of said fourth means, first and second memory means for storing output signals of said first and second gate means, subtraction means for evaluating the difference between the signals representative of the coordinates stored in said first and second memory means, and comparison means for comparing the value of the output signal of said subtraction means and a reference value evaluated from said specific pattern.

10. A pattern recognition system according to claim 1 wherein said third means comprises addition means for adding the output signals of said second means, and comparison means connected to said addition means for comparing the value of the output signal of said addition means and a reference value determined from said specific pattern.

11. A pattern recognition system according to claim 1 wherein said third means comprises an AND circuit for performing an AND logic operation on the output signals of said second means.

* * * * *